(12) United States Patent
Hasegawa et al.

(10) Patent No.: US 7,519,374 B2
(45) Date of Patent: Apr. 14, 2009

(54) COMMUNICATION TERMINAL, INFORMATION SUPPLY SYSTEM, AND INFORMATION SUPPLY METHOD

(75) Inventors: Shin Hasegawa, Tokyo (JP); Manabu Ando, Tokyo (JP); Hironori Matsuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 689 days.

(21) Appl. No.: 11/108,668

(22) Filed: Apr. 19, 2005

(65) Prior Publication Data

US 2005/0239512 A1    Oct. 27, 2005

(30) Foreign Application Priority Data

Apr. 22, 2004  (JP) ............................ P2004-127162
Mar. 29, 2005  (JP) ............................ P2005-095579

(51) Int. Cl.
*H04Q 7/20* (2006.01)
(52) U.S. Cl. .............. 455/456.1; 455/456.3; 455/456.6; 455/457; 340/905
(58) Field of Classification Search .............. 455/456.1, 455/456.3, 456.6, 457, 12.1, 432.1, 404.2, 455/404.1; 714/42; 340/905, 988, 995
See application file for complete search history.

(56) References Cited

U.S. PATENT DOCUMENTS 6,603,977 B1    8/2003  Walsh et al.
6,617,980 B2 *  9/2003  Endo et al. ................... 340/905
6,937,869 B1 *  8/2005  Rayburn ....................... 455/457
6,985,742 B1 *  1/2006  Giniger et al. ........... 455/456.1
2003/0065984 A1 * 4/2003  Takeda et al. .................. 714/42

FOREIGN PATENT DOCUMENTS

JP          2002-92236          3/2002

OTHER PUBLICATIONS

Gerald Bieber, et al., "Personal mobile navigation systems—design considerations and experiences", Computers & Graphics, vol. 25, No. 4, XP-004296033, Aug. 2001, pp. 563-570.

* cited by examiner

*Primary Examiner*—Tony T Nguyen
(74) *Attorney, Agent, or Firm*—Oblon, Spivak, McClelland, Maier & Neustadt, P.C.

(57) ABSTRACT

A mobile device comprises at least a program starter, a communication controller, a display controller, a display portion, and an instruction portion. The mobile device receives report information that is emitted in a predetermined period by a guidance information terminal upon entering the communication area of the guidance information terminal in a state where a guidance information display application has been started by the program starter. The mobile device causes the display portion to display a dialog screen for issuing an instruction with regard to whether to acquire guidance information by means of the display controller upon reception of the report information. When the acquisition of guidance information has been instructed by the instruction portion, the mobile device issues a request to the guidance information terminal to transmit the guidance information by means of the communication controller and receives the guidance information. The guidance information thus received is displayed on the display portion by means of the display controller.

9 Claims, 10 Drawing Sheets

Fig.4
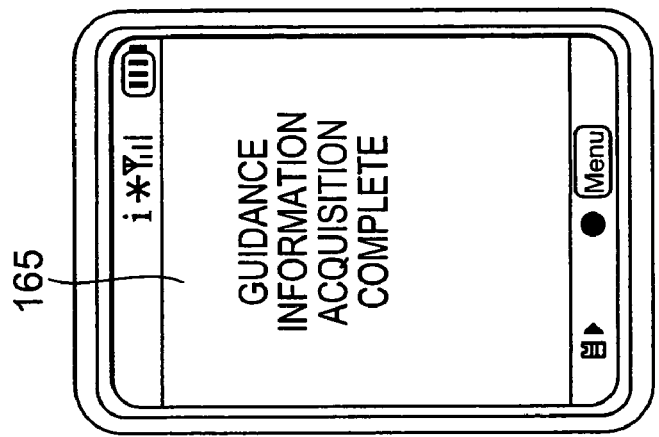
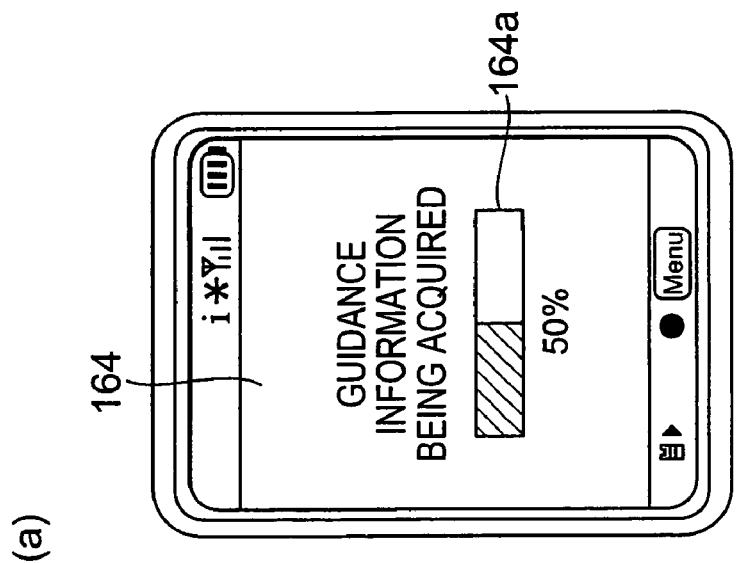

COMMUNICATION TERMINAL, INFORMATION SUPPLY SYSTEM, AND INFORMATION SUPPLY METHOD

BACKGROUND OF THE INVENTION

1. Field of the Invention

The present invention relates to a technology for supplying information from an external device to a communication terminal.

2. Related Background Art

Conventionally, the i-area (registered trademark) has been put to practical use as the technique whereby a communication terminal acquires information relating to the existing area. In an information search utilizing an i-area, the weather, maps, gourmet, and so forth, for example, are prepared as searchable categories. Work is required in which, in order to read desired information, the user of the communication terminal judges which category this information belongs to and retrieves for themselves the object information from among information belonging to the category. As a result, when the user wishes to obtain local information, time and labor and so forth including the search are required depending on the category of information. This does not mean that the desired information will necessarily be obtained as a result of the search work.

The information distribution system described below has been proposed as one technology that resolves the above difficulties (see Japanese Patent Application Laid Open No. 2002-92236 (second page, FIG. 1), for example). That is, in the information distribution system, identification information on the portable terminal of the user and desire information for specifying equipment that the user desires to use are pre-stored in an information management center. When the user uses a facility, upon receiving identification information from the portable terminal, the information distribution device searches for information that will probably be required by the user on the basis of the desire information and sends this information to the portable terminal. As a result, information that is beneficial to the user can be supplied.

SUMMARY OF THE INVENTION

However, with the above conventional technology, the user of the communication terminal (portable terminal) must pre-register the identification information on the communication terminal and the desire information on the user in an external device. Therefore, as well as the work and time required for this operation, desire information that is beneficial to the user who is unable to know information relating to a facility beforehand cannot be registered. Furthermore, in an art gallery, for example, in cases where the user wishes to know detailed information relating to a specified picture (the name of the work, the artist, and the year and month the work was created, and so forth), when the desired information is local information, the desire information must be divided up and the registration work is difficult for the user. In addition, in order for the communication terminal to receive information, processing to transmit identification information on the communication terminal to the external device is necessary. However, for this purpose, an operation or processing that designates the address and instructs transmission or the like is required.

Therefore, an object of the present invention is to allow a communication terminal to acquire information unique to the present position simply and rapidly.

In order to achieve this object, the communication terminal according to the present invention comprises starting means for starting an application program for displaying supply information that is transmitted by an external device; reception means for receiving report information that is emitted by the external device and which communicates the existence of the external device; display control means for causing display means to display a screen for issuing an instruction with regard to whether the supply information is to be acquired upon reception of the report information by the reception means in a state where the application program has been started by the starting means; and instruction means for issuing an instruction to acquire the supply information via the screen that is displayed by the display control means, wherein the reception means receive the supply information by issuing a request to the external device to transmit the supply information when acquisition of the supply information has been instructed by the instruction means; and the display control means cause the display means to display the supply information received by the reception means.

The information supply method according to the present invention comprises a starting step in which a communication terminal that is capable of communicating with an external device starts an application program for displaying supply information that is transmitted by the external device; a report information reception step in which the communication terminal receives report information that is emitted by the external device and which communicates the existence of the external device; an instruction screen display control step in which the communication terminal causes display means to display a screen for issuing an instruction with regard to whether the supply information is to be acquired upon reception of the report information in the report information reception step in a state where the application program has been started in the starting step; an instruction step in which the communication terminal issues an instruction to acquire the supply information via the screen that was displayed in the instruction screen display control step; a supply information reception step in which the communication terminal receives the supply information by issuing a request to the external device to transmit the supply information when acquisition of the supply information has been instructed in the instruction step; and a supply information display control step in which the communication terminal causes the display means to display the supply information received in the supply information reception step.

Here, a communication terminal is an information terminal with a communication function such as a portable phone, PDA (Personal Digital Assistant) and so forth, for example.

According to this invention, the communication terminal presents a screen for instructing the acquisition of supply information to the user upon reception of report information that is transmitted by an external device. When the user of the communication terminal instructs the acquisition of supply information, a transmission request is transmitted by the communication terminal to the external device. Upon receiving the supply information that has been transmitted by the external device, the communication terminal displays the supply information to the display means. Therefore, the user of the communication terminal is able to know easily that supply information can be acquired in a straightforward operation in which an application program is started or the like.

Here, the receipt of supply information even in cases where the user of the communication terminal does not necessarily wish to read the supply information because identification information on the communication terminal is not required when the external device distributes supply information is a cause for concern. However, by making sure that the communication terminal displays the acquisition instruction screen or does not start an application program in advance of a transmission request for supply information, the user of the communication terminal is able to choose whether or not to acquire the supply information, whereby this concern is eliminated. Further, as a result of the user ordering receipt of the supply information, information unique to the present position of the communication terminal can be acquired simply and rapidly.

In the case of the communication terminal of the present invention, the supply information is preferably information in which there is little temporal change. Information in which there is a small amount of temporal change is information in which there is normally no change in units spanning a few hours as in the case of a map showing the business hours and location and so forth of a store, for example. According to the present invention, information that is transmitted by an external device to a communication terminal is information in which there is little temporal change and supply information that has been temporarily stored in the external device can be used universally at fixed intervals without being updated. Further, because it is sufficient to store supply information in the area in which the device is installed (in the site of a department store or an amusement park or the like, for example) in the external device, processing to select supply information constituting the transmission target is easily completed. Therefore, the time until the external device actually starts transmission after receiving a transmission request for supply information is shortened.

In the case of the communication terminal of the present invention, the supply information is link information (a URL, for example) indicating a connection destination other than the external device, the reception means request transmission of display information to the connection destination indicated by the link information and receive the display information, and the display control means cause the display means to display the display information received by the reception means.

As per the present invention, the supply information transmitted by the external device to the communication terminal can be link information indicating a connection destination other than the external device (a server device, for example). In this case, the transmission request destination of the information is not the external device itself, which is the transmission source of the link information but instead the device of the connection destination and the information returned by this device is displayed on the communication terminal as display information. According to the present invention, it is possible to supply information that is not held by the external device to the communication terminal and, therefore, the variety of the information that can be read by the user increases and user convenience is enhanced.

The fact that the display information that is displayed by the communication terminal is domestic information on the connection destination (information within Japan when the communication terminal is located abroad, for example) is particularly effective. In this case, the reception means receive the domestic information by requesting transmission of the domestic information from the connection destination indicated by the link information via an international network.

According to the present invention, the communication terminal receives information that is transmitted from abroad by accessing a device that is capable of a connection via the international network. Therefore, supposing that the information is foreign information (domestic information from the perspective of the transmission source), when the user of the communication terminal returns from the country to which they have voyaged, information from the voyage source is then transmitted to the communication terminal before boarding. As a result, the usefulness of the information acquired by the communication terminal increases and the user is able to obtain the information easily. As a result, user convenience can be enhanced still further.

In addition, a constitution comprising a communication terminal and external device and in which the external device transmits the supply information in accordance with a request from the communication terminal can also be adopted for the information supply system of the present invention.

According to the present invention, the communication terminal is able to acquire information unique to the present position thereof simply and rapidly.

BRIEF DESCRIPTION OF THE DRAWINGS

FIG. 3(a) shows a display screen of a mobile device when the guidance information display application is started;

FIG. 3(b) shows a display screen of a mobile device when same is within the communication area of the guidance information terminal;

FIG. 3(c) shows a dialog screen that is displayed upon reception of report information;

FIG. 4 shows a display screen of a mobile device;

FIG. 4(a) shows a display screen of a mobile device when the guidance information is being acquired;

FIG. 4(b) shows a display screen of a mobile device when acquisition of the guidance information is complete;

FIG. 5(a) shows a guidance-information menu screen;

FIG. 5(b) shows a display screen of a mobile device following the selection of universal guidance information;

FIG. 6(a) shows a display screen of a mobile device following the selection of time-dependent guidance information;

FIG. 6(b) shows a screen on which guidance information that is acquired over the Internet is displayed;

FIG. 10(a) shows a menu screen on which randomly distributed guidance information appears; and FIG. 10(b) shows a display screen of a mobile device following the selection of randomly distributed guidance information.

DESCRIPTION OF THE PREFERRED EMBODIMENTS

First Embodiment

Figure 1:
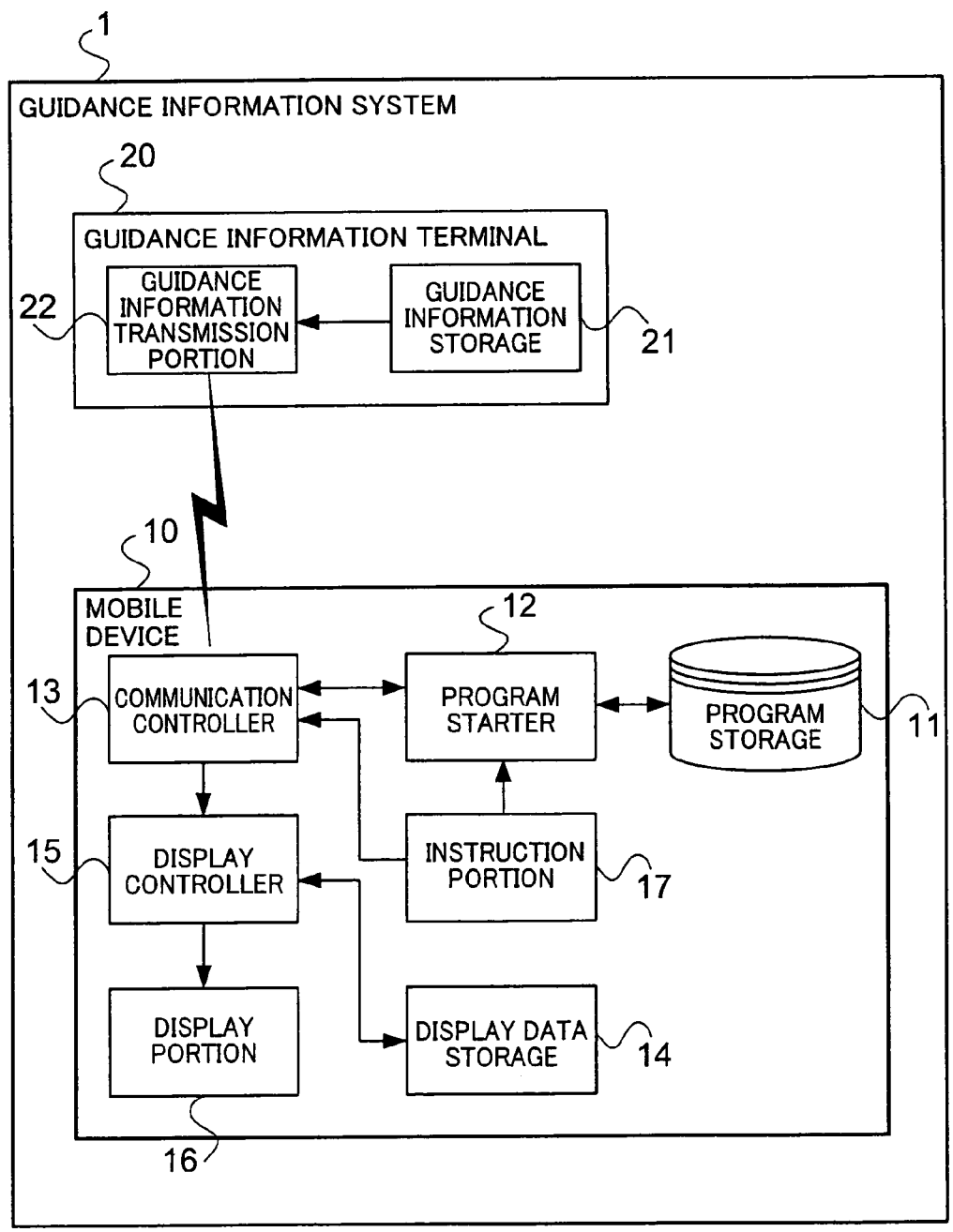
FIG. 1 is a block diagram for illustrating the functional constitution of a guidance information system of a first embodiment of the present invention.

The first embodiment of the present invention will be described hereinbelow with reference to the drawings attached for illustrative purposes. First, the constitution of a guidance information system 1 of this embodiment will be described. FIG. 1 is a block diagram illustrating the functional constitution of the guidance information system 1. As shown in FIG. 1, the guidance information system 1 comprises a mobile device 10 (corresponds to the communication terminal) and a guidance information terminal 20 (corresponds to the external device), wherein the mobile device 10 is connected so as to be capable of transmitting and receiving various signals to and from the guidance information terminal 20 via a short range wireless line. Short distance wireless communications are implemented by means of wireless LAN, Bluetooth (registered trademark) and infrared communications, and so forth, for example.

The constitution of the mobile device 10 will now be described. As shown in FIG. 1, the mobile device 10 comprises, as functional constituent elements, a program storage 11, a program starter 12 (corresponds to starting means), a communication controller 13 (corresponds to receiving means), a display data storage 14, a display controller 15 (corresponds to display control means), a display portion 16, and an instruction portion 17 (corresponds to instruction means).

Here, the program storage 11 and display data storage 14 are physical constituent elements corresponding to internal memories such as EEPROM (Electrically Erasable and Programmable Read Only Memory) or the like. The display portion 16 is, similarly, a physical constituent element corresponding to a display device such as an LCD (Liquid Crystal Display) and ELD (ElectroLuminescence Display). The program starter 12, communication controller 13, display controller 15 and instruction portion 17, which are the other constituent elements, are implemented as a result of software that is held in the internal memory being executed by a CPU (Central Processing Unit).

Each constituent element of the mobile device 10 will now be described in detail hereinbelow.

A guidance information display application is held in the program storage 11 as an application program to allow the mobile device 10 to execute a series of processes from reception of report information to the display of guidance information (corresponding to supply information). The guidance information display application comprises display data (icons) for notifying the user that the guidance information terminal 20 exists in the vicinity of the mobile device 10 and display data (a dialog screen) that is used to instruct the acquisition of guidance information.

The program starter 12 reads and starts the guidance information display application that is held in the program storage 11. This application may be started in accordance with instructions made by the user of the mobile device 10 or may be started automatically immediately after being downloaded, for example. The guidance information display application thus started can also be established on a standby screen.

When the guidance information display application is started, the communication controller 13 receives report information that is emitted in predetermined periods by the guidance information terminal 20. The communication controller 13 receives the report information and senses the existence of the guidance information terminal 20 through the reception processing. The fact the existence of the guidance information terminal 20 has been sensed is communicated to the display controller 15 located at a subsequent stage. Further, when a guidance information acquisition instruction is inputted by the instruction portion 17, the communication controller 13 transmits a guidance information transmission request to the guidance information terminal 20. The communication controller 13 receives guidance information addressed to the mobile device 10 that has been sent by the guidance information terminal 20.

Icon and dialog screen display data that is contained in the guidance information display application is held in the display data storage 14 as the guidance information display application is downloaded. Details will be provided subsequently, but the icons are used to notify the user of the existence of the guidance information terminal 20 supplying the guidance information and the dialog screens are used to confirm with the user whether the user wishes to acquire the guidance information. Further, guidance information that has been transmitted by the guidance information terminal 20 is held in the display data storage 14.

The display controller 15 displays display data read from the display data storage 14 or guidance information acquired via the communication controller 13 on the display portion 16 in accordance with instructions from the communication controller 13. More specifically, the display controller 15 reads icons indicating the existence of the guidance information terminal 20 from the display data storage 14 and displays the icons on the display portion 16 upon reception of report information by the communication controller 13. In addition, when an icon is selected after guidance information is sensed, the display controller 15 reads the dialog screen from the display data storage 14 and displays same on the display portion 16.

The display portion 16 displays display data and guidance information in accordance with instructions from the display controller 15.

The instruction portion 17 is an interface when the user performs a variety of input operations such as buttons and dials. The instruction portion 17 instructs the program starter 12 to start the guidance information display application in accordance with the user operations. Further, the instruction portion 17 instructs the communication controller 13 to acquire guidance information in accordance with user operations.

The constitution of the guidance information terminal 20 will be described next. The guidance information terminal 20 comprises, as functional constituent elements, a guidance information storage 21 and a guidance information transmission portion 22. Guide information unique to the installation position of the guidance information terminal 20 is stored in the guidance information storage 21. Guide information is broadly classified into universal information with little temporal variation and time-dependent information. The former guidance information has a low update requirement and the data itself that is held in the guidance information storage 21 can always be used as supply information. On the other hand, the latter guidance information needs to be suitably updated as time elapses and the data held in the guidance information storage 21 is used as information (a menu) indicating the types of supply information and the actual supply information is received from a Web site via the Internet.

The content of the guidance information thus held differs in accordance with the installation location of the guidance information terminal 20 and the content of the services that are supplied. For example, when the guidance information terminal 20 is installed in a theme park (including an amusement park), the universal guidance information is an operating hours guide, map information in the theme park, event-related information, a restaurant guide, a shopping guide, and so forth. Time-dependent guidance information is information on the congested status of an attraction and the weather and so forth. By randomly distributing electronic service tickets (restaurant coupons, shopping discount coupons and attraction tickets, and so forth) as other guidance information, the interest of the user and value to the user can be enhanced.

For example, when the guidance information terminal 20 is installed in a sight-seeing area, universal guidance information is, for example, information on sightseeing spots (recommended sightseeing routes, maps of sightseeing areas), history, origins, and noted products, guide of seasonal points of interest and highlights, store guide (dining, souvenirs), traffic information (bus timetables, bus stops, taxi ranks, train station locations), and search services for sightseeing spots and stores, and so forth. Further, time-dependent information is information relating to the weather, for example, and, more specifically, the weather, temperature, air pressure, wind direction, wind speed, amount of precipitation, probability of precipitation, degree of cloudiness, and so forth.

When the guidance information terminal 20 is installed at a ski resort, the universal information may include ski slope information (ski slope map, explanation of courses and features, restaurant and shop guide), hours of operation (lift operating hours, restaurant and shop opening hours), neighborhood information (access to the nearest ski slopes, course descriptions, hot spring information), lodging facility guide, lodging facility and hot spring search services in accordance with budget. Further, time-dependent guidance information is, for example, the weather, snowfall, snow quality, temperature, lift operating status and congestion status. The random distribution of electronic service tickets (restaurant and shop discount coupons and so forth) as other guidance information is also effective from the standpoint of enhancing interest, value, and so forth.

In addition, in cases where the guidance information terminal 20 is installed in a department store, examples of universal guidance information include a business hours guide, sales floor guide (including a floor map), sale information, a restaurant guide, keyword-based search services for points of sale and product information (prices and merits, and so forth). By randomly distributing electronic service tickets (restaurant coupons, shopping discount coupons, and so forth) as other guidance information, the interest of the user and desire to purchase can be enhanced.

The guidance information transmission portion 22 usually emits report information for communicating the existence of the guidance information terminal 20 to the mobile device. Upon receiving a guidance information transmission request from the mobile device 10, the guidance information transmission portion 22 reads guidance information from the guidance information storage 21 and transmits same to the mobile device 10 which is the source of the request.

The guidance information terminal 20 can be installed in a plurality of locations and, therefore, an aspect in which a plurality of guidance information terminals 20 is included in the guidance information system 1 can also be assumed. In this regard, guidance information that differs according to the installation location, that is, guidance information unique to the guidance information terminal 20 or the communication area thereof, may be pre-stored in each of the guidance information terminals 20. As a result, processing in which the guidance information terminal 20 selects guidance information from among a plurality of guidance information is unnecessary. Further, because the guidance information stored in each guidance information terminal 20 is limited, the selection of guidance information by the user is straightforward.

Figure 2:
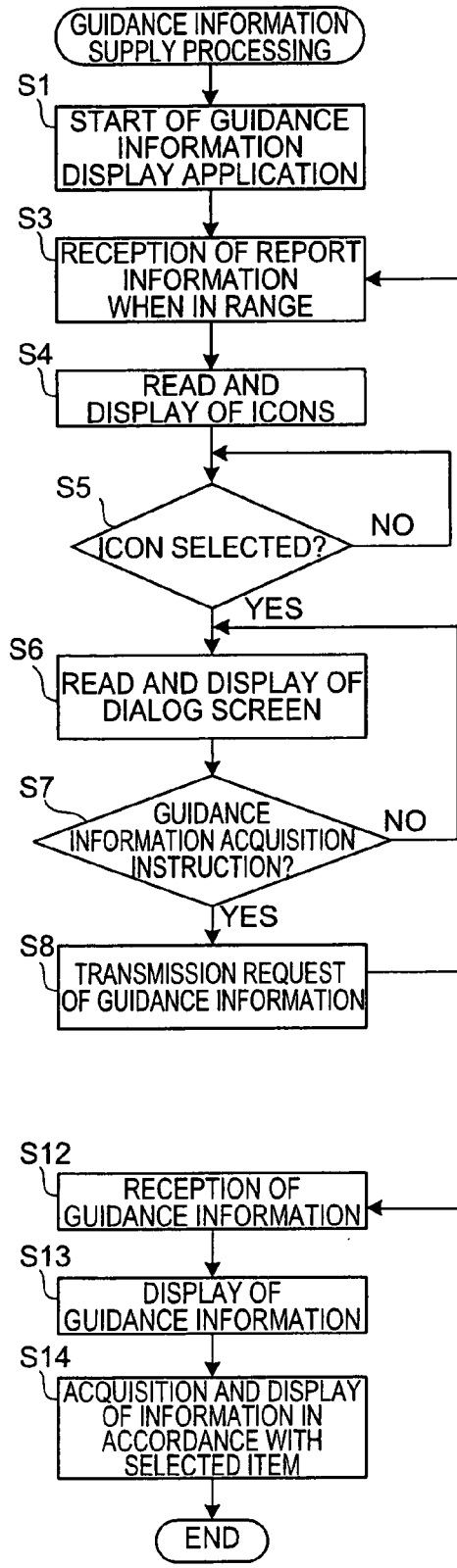
FIG. 2 is a flowchart for illustrating the operation of the guidance information system of the first embodiment of the present invention.

The operation of the guidance information system 1 will be described subsequently and, at the same time, each of the steps constituting the information supply method of the present invention will be described. FIG. 2 is a flowchart serving to illustrate the guidance information supply processing that is executed by the guidance information system 1.

Figure 3:
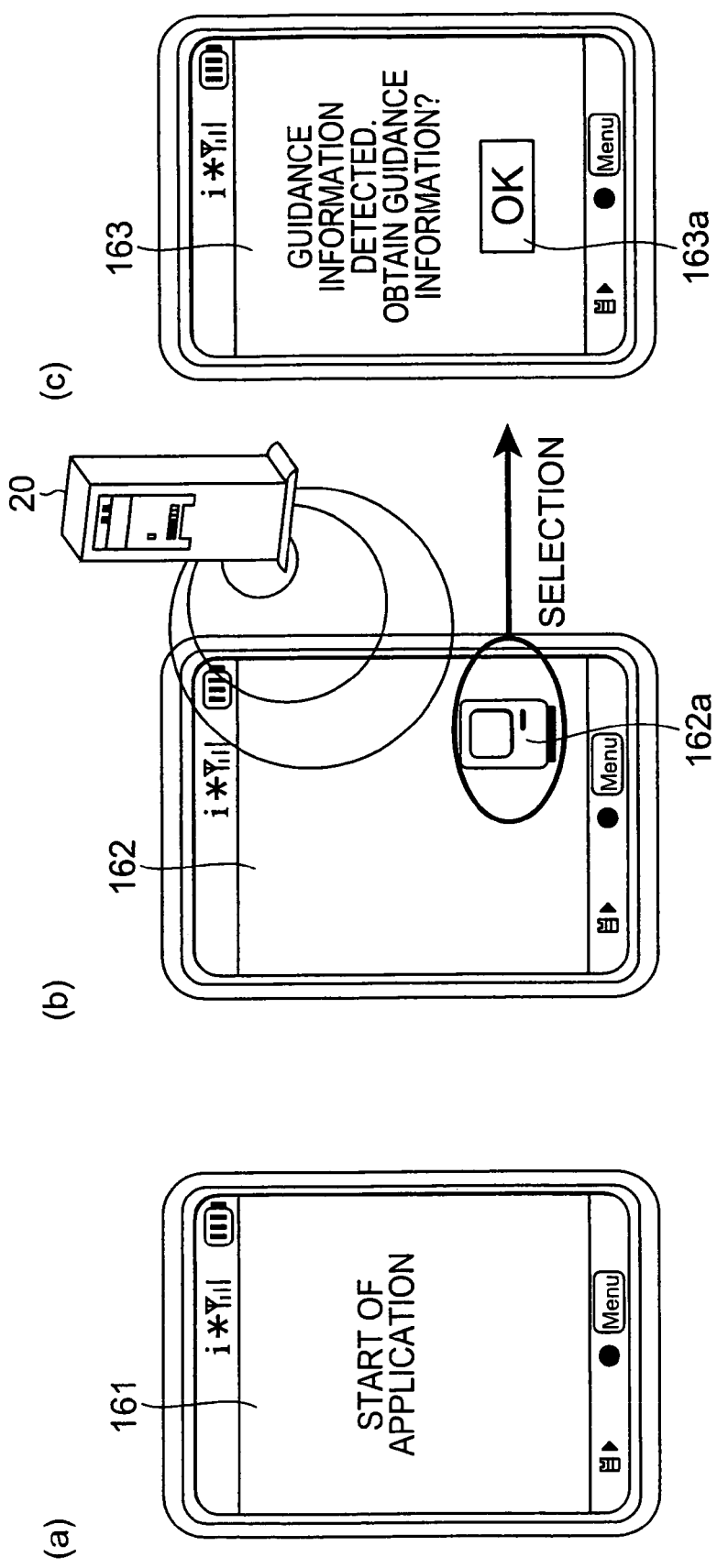
FIG. 3 shows a display screen of a mobile device.

First, in S1, the guidance information display application that is held in the program storage 11 is started by the program starter 12 in accordance with an instruction by the user of the mobile device 10. An example of the display screen of the mobile device 10 at this time is shown in FIG. 3(a). As a result, when the guidance information terminal 20 is in the vicinity, the user of the mobile device 10 completes preparations to identify this fact.

The guidance information terminal 20 emits report information by means of the guidance information transmission portion 22 (S2) and, therefore, when the mobile device 10 enters the communication area of the guidance information terminal 20 in accordance with the movement of the user, the mobile device 10 is capable of receiving report information (S3). Upon reception of report information by the communication controller 13 of the mobile device 10, the display controller 15 reads an icon from the display data storage 14 and displays same on the display portion 16 (S4). When the guidance information display application is used on the standby screen, the icon 162a indicating the existence of the guidance information terminal 20 is displayed on the standby screen 162 as shown in FIG. 3(b).

In S5, the mobile device 10 awaits the operation to select the icon displayed in S4. When the user selects the icon (S5; YES), in response to the selection, the display controller 15 reads the dialog screen that is pre-stored in the display data storage 14 and displays same on the display portion 16 (S6). The dialog screen that is displayed at this time is illustrated in FIG. 3(c).

Referring now to FIG. 3(c), a software button 163a for ordering the acquisition of guidance information is provided on the dialog screen 163 and, while the button is displayed, the communication controller 13 of the mobile device 10 awaits the input of an instruction from the instruction portion 17 (S7). When the user of the mobile device 10 orders the acquisition of guidance information via the instruction portion 17 (S7; YES), the communication controller 13 in the standby state senses the instruction input and issues a request to the guidance information terminal 20 to transmit guidance information (S8). Thus, as a result of the transmission of guidance information being requested in accordance with an instruction from the user, the mobile device 10 no longer sends or receives guidance information that the user does not wish to reference. As a result, an increase in traffic that accompanies unnecessary data communications is suppressed.

In S9, the guidance information terminal 20 receives the guidance information transmission request that was transmitted in S8 from the guidance information transmission portion 22 and acquires, for the purpose of transmission, guidance information that is stored in the guidance information storage 21 (S10). Further, the sending and receiving of guidance information through short range wireless communications is started between the guidance information terminal 20 and mobile device 10 (S11, S12). A display screen 164 of the mobile device 10 during guidance information acquisition is shown in FIG. 4(a). When the sending and receiving of guidance information is complete, the display screen of the mobile device 10 moves to the state shown in FIG. 4(b) and this fact is communicated to the user.

Figure 5:
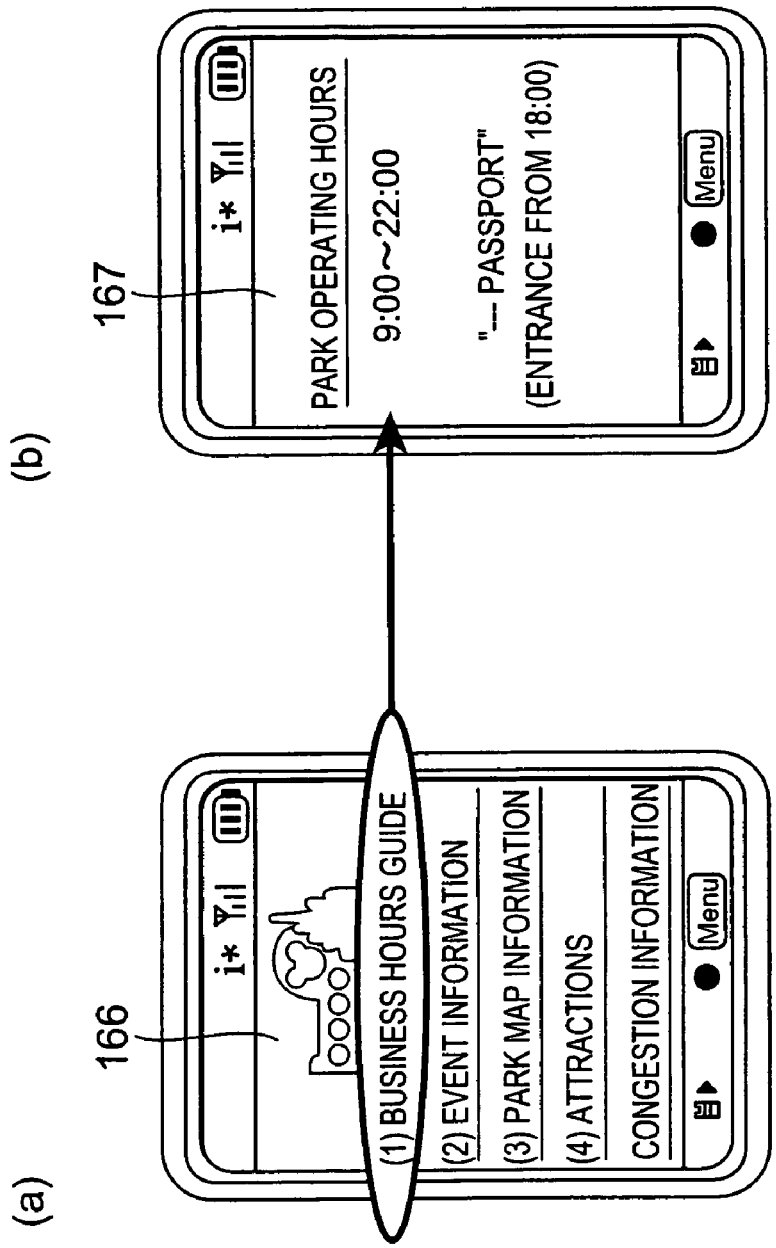
FIG. 5 shows a display screen of a mobile device.

Returning now to FIG. 2, in S13, the guidance information that is received from the communication controller 13 of the mobile device 10 is inputted to and displayed on the display portion 16 via the display controller 15. Assuming that this system is applied to a theme park, the display screen 166 shown in FIG. 5(a) is displayed on the display portion 16 of the mobile device 10. As shown in FIG. 5(a), the display screen 166 includes, as universal guidance information, "(1) an operating hours guide, (2) event information, and (3) park map information". Further, "(4) congested status of attraction" is included as time-dependent guidance information. Each of items (1) to (4) is displayed so as to be selectable by the user via the instruction portion 17.

In S14 in FIG. 2, when "(1) operating hours guide", which is one item of universal guidance information, is selected, detailed guidance information corresponding to this information item is displayed on the display portion 16. An example of the display screen of the mobile device 10 at this time is shown in FIG. 5(b). The guidance information that is then displayed is a portion of the guidance information that was received in S12. As a result, the user of the mobile device 10 is able to read the usage time range of the "(1) park operating hours" and "---passport" as detailed guidance information from guidance information constituting "the operating hours guide".

Thus, when the display of universal guidance information is instructed, the mobile device 10 is able to present information desired by the user to the user without newly acquiring guidance information by using guidance information that was received in S12 in FIG. 2. However, in S14, when "(4) congested status of attraction", which is time-dependent guidance information, is selected, processing to acquire corresponding detailed guidance information from the external device is required. This is because it is difficult to pre-store this guidance information in the guidance information terminal 20 on account of the temporal variation in the content of the guidance information. Further, while guidance information according to temporal variations is stored at any time in the guidance information terminal 20, if the user is unable to access the guidance information terminal 20 each time the guidance information is updated, the user invests time but is unable to obtain accurate information.

Figure 6:
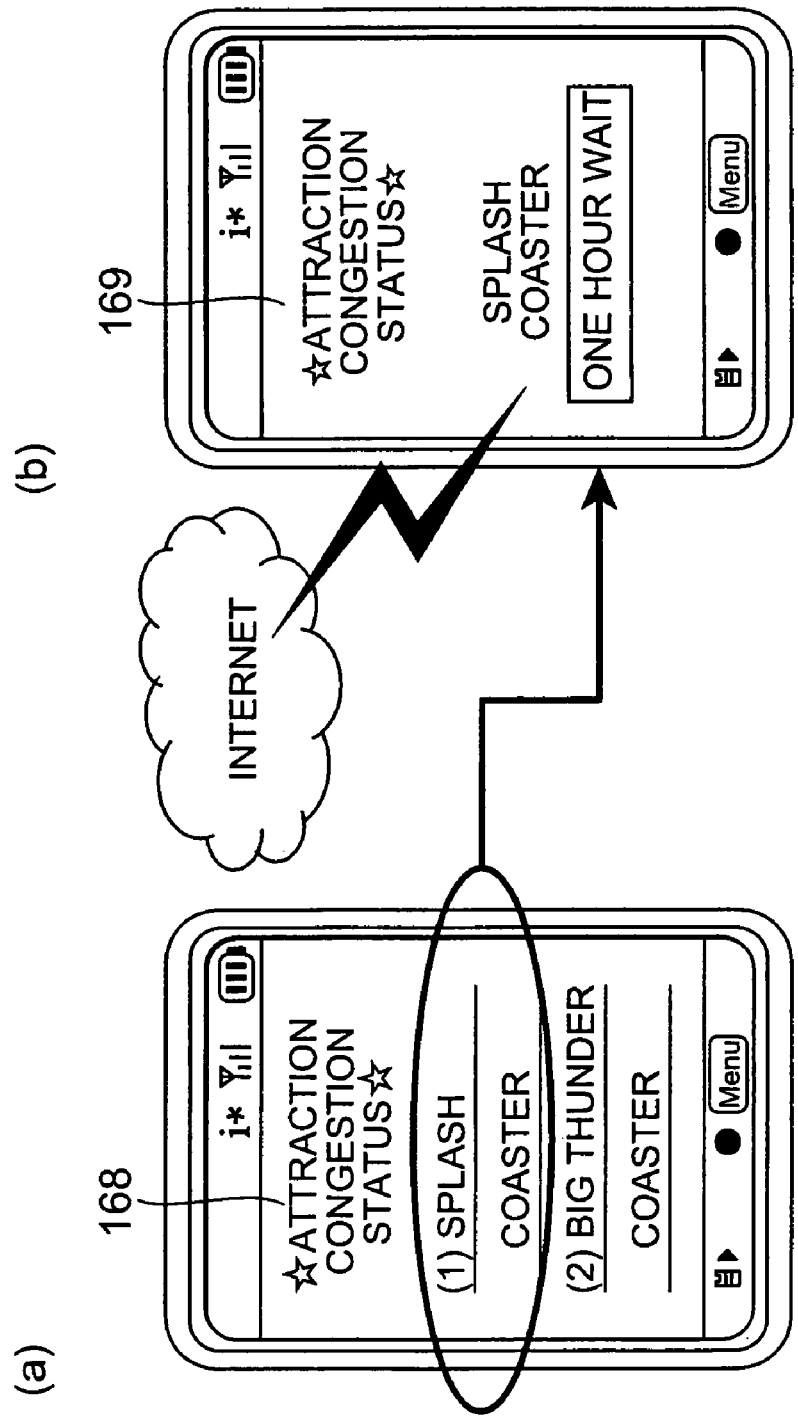
FIG. 6 shows a display screen of a mobile device.

Therefore, the mobile device 10 acquires the details of time-dependent guidance information from outside via a communication network such as the Internet. For example, when "(4) congested status of attraction" is selected, submenu screen data in which the types of attraction appear are received and displayed. An aspect in which a submenu 168 is displayed on the display portion 16 of the mobile device 10 is shown in FIG. 6(a). A plurality of names of attractions the congested status of which can be referenced are included in the submenu as selection candidates. As a result of the user selecting the attraction names for which there is an interest to know the congested status from among the selection candidates, data indicating the latest congested status (wait time, for example) is also received and displayed. An example of the display screen of the mobile device 10 at this time is shown in FIG. 6(b).

As described earlier, according to the guidance information system 1 of the present invention, guidance information that is to be supplied to peripheral mobile devices including the mobile device 10 is pre-registered in the guidance information terminal 20. When the mobile device 10 enters the communication area of the guidance information terminal 20, the mobile device 10 senses the existence of the guidance information terminal 20, that is, the fact that the mobile device 10 itself is able to acquire guidance information, from the report information. Further, when the user of the mobile device 10 orders acquisition of guidance information, the mobile device 10 starts communicating with the guidance information terminal 20 and receives and displays guidance information. Because guidance information unique to the installation environment can be registered in the guidance information terminal 20 and the guidance information is temporally universal, there is no need for the administrator to update the guidance information at short intervals. Therefore, with the guidance information system 1, information that is useful according to the present position of the user can be supplied rapidly by means of a simple system constitution.

Second Embodiment

The second embodiment of the present invention will be described next with reference to FIGS. 7 and 8. Although a domestic exchange of guidance information was assumed in the case of the guidance information system 1 of the first embodiment, an aspect in which a mobile device acquires domestic information while abroad taking a mobile device with an international roaming capability as an example will be described in this embodiment.

Figure 7:
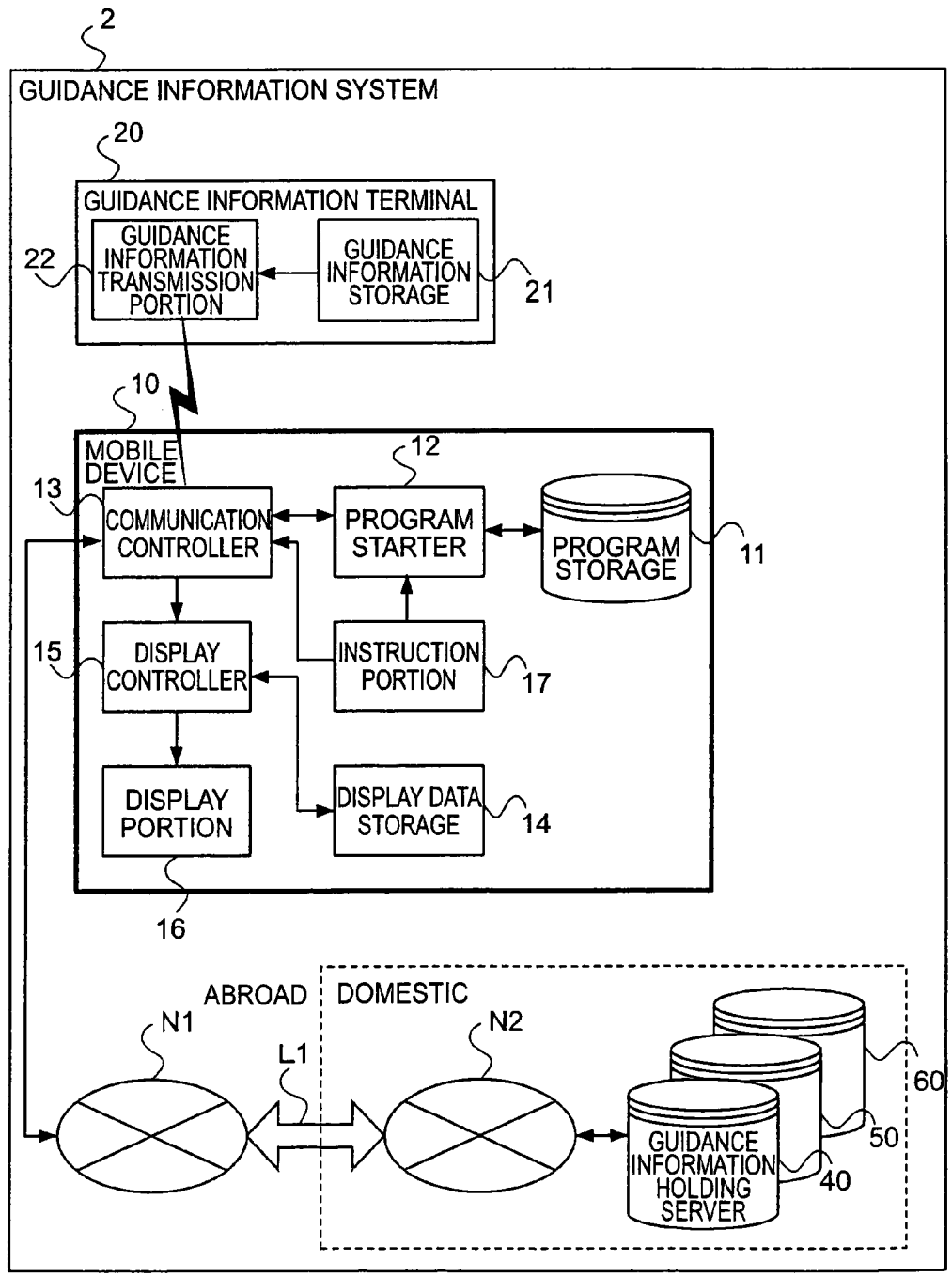
FIG. 7 is a block diagram for illustrating the functional constitution of a guidance information system of a second embodiment of the present invention.
Figure 8:
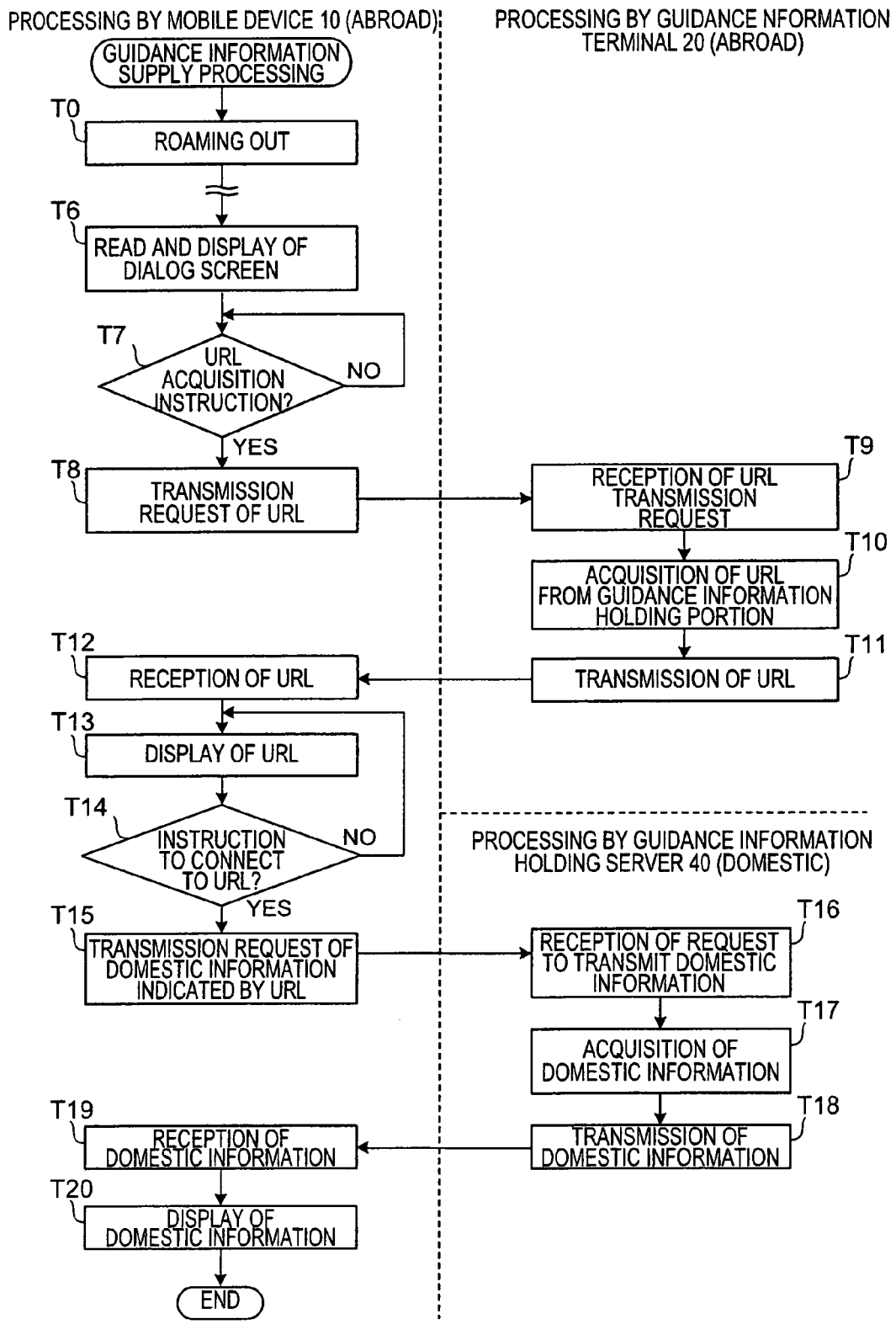
FIG. 8 is a flowchart for illustrating the operation of the guidance information system of the second embodiment.

FIG. 7 is a block diagram showing the functional constitution of the mobile device of the second embodiment. The constitution of the mobile device and guidance information terminal of this embodiment is the same as the constitution of the mobile device 10 and guidance information terminal 20 detailed in the first embodiment. Therefore, the same reference numerals are assigned to common constituent elements, a description thereof is omitted, and the differences from the first embodiment will be detailed hereinbelow.

That is, as shown in FIG. 7, the mobile device 10 comprises, as functional constituent elements, a program storage 11, a program starter 12 (corresponds to starting means), a communication controller 13 (corresponds to receiving means), a display data storage 14, a display controller 15 (corresponds to display control means), a display portion 16, and an instruction portion 17 (corresponds to instruction means). Each of these constituent elements is connected so as to be capable of mutual input/outputs of signals.

Further, the guidance information terminal 20 comprises a guidance information storage 21 and guidance information transmission portion 22.

As well as being capable of communicating with the guidance information terminal 20, the communication controller 13 is capable of two-way communications with guidance information holding servers 40, 50, and 60 (corresponds to the server device) that are connected to the domestic Internet via a variety of networks. That is, the communication controller 13 sends and receives data to and from the guidance information holding servers 40, 50, and 60 via a GPRS (General Packet Radio Service) network N1, which is a packet communication network constructed abroad, an international dedicated line L1 linking the domestic network and the foreign network, and a business communication network N2, which is a packet communication network that is constructed in Japan.

The guidance information supply processing of the second embodiment will be described next with reference to FIG. 8. At the same time, each step constituting the information supply method of the present invention will be described. Further, the guidance information supply processing includes a plurality of steps that are common to the guidance information supply processing detailed in the first embodiment (see FIG. 2). More specifically, S1 to S6 shown in FIG. 2 are equivalent to T1 to T6 (however, T1 to T5 are omitted).

T0, and T7 to T20, which are specific to the guidance information supply processing of the second embodiment, will be described hereinbelow.

As a preamble to the operation description, the mobile device performs a connected network shift from a domestic network to a foreign network (roaming out) by means of an international roaming function prior to acquiring guidance information (T0).

When a dialog screen is displayed on the display portion 16 of the mobile device 10 via the processing T1 to T6, the mobile device 10 awaits a URL (Uniform Resource Locator) acquisition instruction (T7). In T8 to T13, the mobile device 10 executes the same processing as S8 to S13 with the guidance information (corresponds to supply information) of the first embodiment as the URL (corresponds to the link information). As a result, the URL of the guidance information holding server 40 where domestic information (corresponds to display information) is held is displayed on the display portion 16.

When the mobile device 10 senses an instruction to connect to the URL according to an input operation of the instruction portion 17 (T14:YES), a request to transmit information indicated by the URL is transmitted to the guidance information holding server 40 by the communication controller 13 (T15). In this embodiment, the information indicated by the URL is domestic information and, therefore, a transmission request signal for domestic information is transmitted via the GPRS N1, international dedicated line L1, and business communication network N2.

In T16, the guidance information holding server 40 receives the transmission request that has been sent from abroad. The guidance information holding server 40 acquires domestic information from the guidance information storage on the basis of the transmission request (T17). The guidance information holding server 40 holds Japanese news and information around airports, for example, as domestic information, and transmits domestic information that is acquired in accordance with a request to the foreign mobile device 10 (T18).

Upon receiving the domestic information transmitted by the T18 via the international dedicated line L1 (T19), the mobile device 10 displays the information on the display portion 16 in accordance with an instruction from the display controller 15 (T20).

As described above, according to a guidance information system 2 of this embodiment, the mobile device 10 uses the URL that is acquired from the guidance information terminal 20 installed abroad after the URL has been downloaded to connect to the domestic guidance information holding server 40 and receive domestic information. As a result, the following operating results, for example, are exhibited. That is, when the mobile device 10 returns to the home country from abroad, by connecting to the guidance information terminal 20 in the travel destination airport, the mobile device 10 is able to acquire domestic information that is particularly useful at the airport while abroad. For example, the user is able to read peripheral information for the airport at which they are planning to arrive (weather, temperature, route information, traffic congestion status and so forth) while traveling abroad simply and rapidly before returning home. As a result, convenience upon arrival is enhanced. In addition, supposing that the mobile device 10 acquires Japanese news from the guidance information holding server 40 while traveling, the user is able to acquire information at an early stage and also save time in comparison with a case where information is acquired upon returning to their home country.

Figure 9:
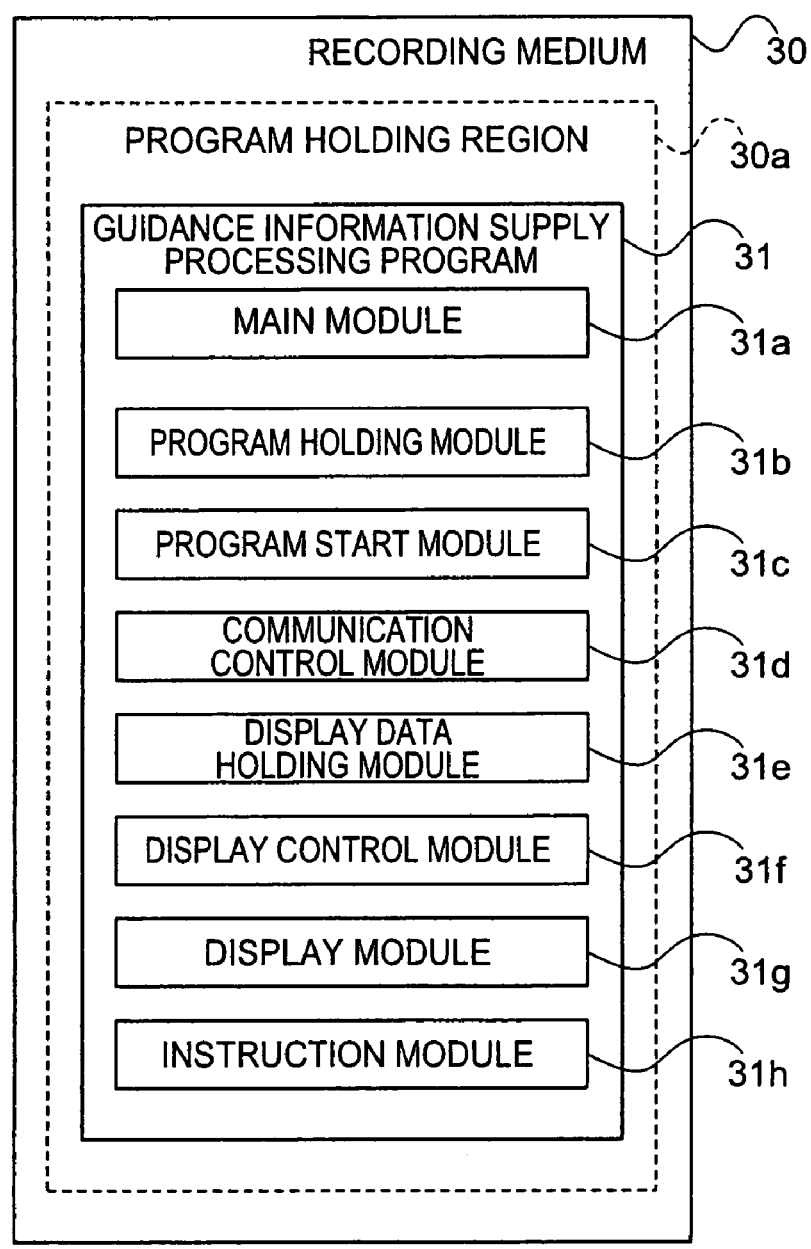
FIG. 9 shows the constitution of a guidance information supply processing program of the present invention.

A guidance information supply processing program that causes the mobile device 10 to execute a series of guidance information supply processes will be described next. As shown in FIG. 9, a guidance information supply processing program 31 is stored in a program holding region 30a that is formed on a recording medium 30. The guidance information supply processing program 31 comprises, as constituent units, a main module 31a for centrally controlling the guidance information supply processing, a program holding module 31b, a program start module 31c, a communication control module 31d, a display data holding module 31e, a display control module 31f, a display module 31g, and an instruction module 31h.

The application program that is held by executing the program holding module 31b is the same as the application program that is held in the program storage 11 of the mobile device 10. The functions that are implemented by executing the program start module 31c are the same as the functions of the program starter 12. That is, the program start module 31c starts the application program that is held in the program storage 11 in accordance with an instruction from the user or a start request from outside. The functions that are implemented by executing the communication control module 31d are the same as the functions of the communication controller 13. That is, the communication control module 31d receives report information that is transmitted by the guidance information terminal 20 and executes a guidance information transmission request and reception processing.

The display data that is stored by executing the display data holding module 31e is the same as the display data held in the display data storage 14 of the mobile device 10. The functions that are implemented by executing the display control module 31f are the same as the functions of the display controller 15. That is, the display control module 31f acquires display data from the display data storage 14 and displays same on the display portion 16 and displays guidance information that is received by the communication controller 13 on the display portion 16. The display data that is held by executing the display module 31g is the same as the display data that is held in the display data storage 14 of the mobile device 10. The functions that are implemented by executing the instruction module 31h are the same as the functions of the instruction portion 17. That is, the instruction module 31h executes the start of the application program and the acquisition of the guidance information in accordance with an input operation by the user.

Further, the present invention is not limited to each of the above embodiments. Modifications can also be suitably adopted within a range not departing from the spirit of the present invention. For example, although, the guidance information that is distributed to the mobile devices is unchanged for each mobile device requesting transmission in the above embodiment, different supply information may be transmitted only to optional mobile devices among a plurality of mobile devices requesting transmission. Different supply information is electronic service tickets, for example. Service tickets are transmitted as a portion of the guidance information by the guidance information terminal 20, the transmission timing being determined randomly. Therefore, even when the mobile device requesting the transmission of guidance information is the same, whether guidance information including service tickets is acquired depends on the timing of the request. As a result, user interest is enhanced.

Figure 10:
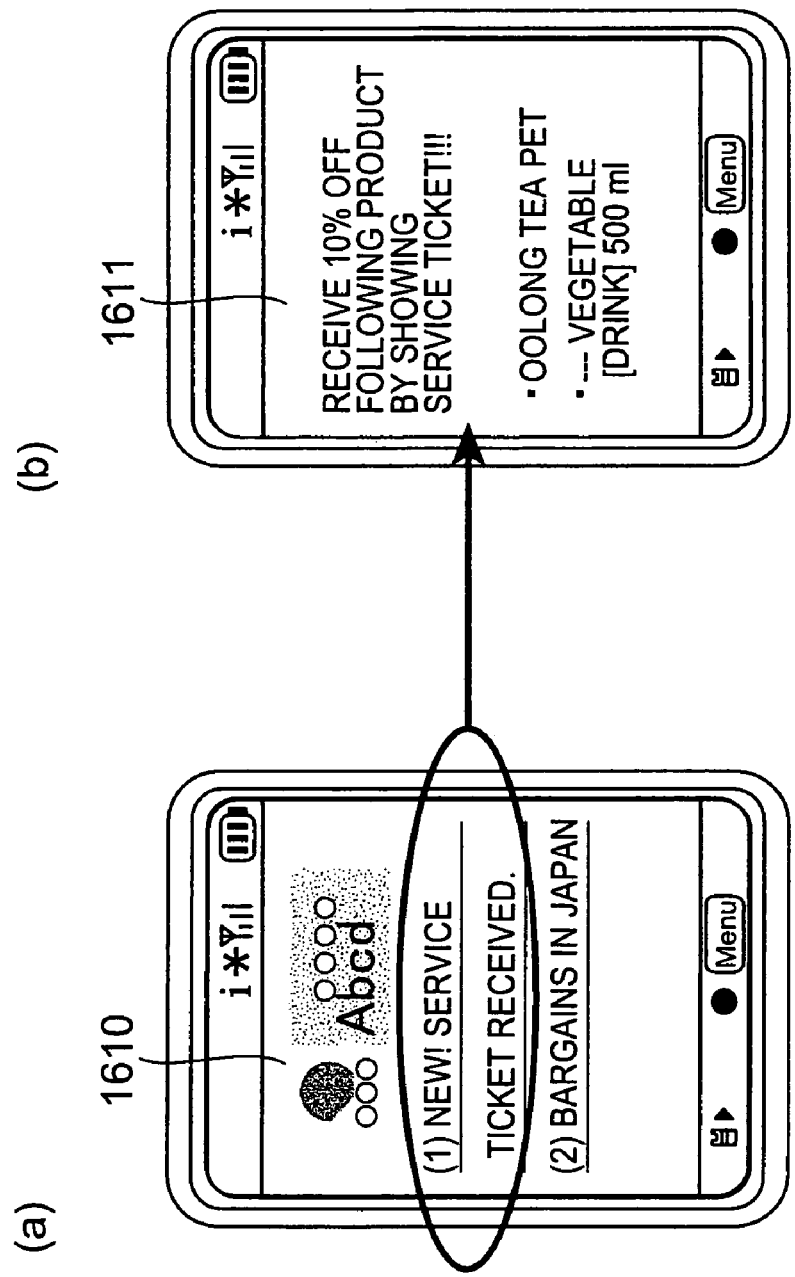
FIG. 10 shows a display screen of a mobile device.

FIG. 10(a) shows an example of a screen that is displayed on the display portion 16 of the mobile device 10 receiving guidance information including service tickets in a department store. As shown in FIG. 10(a), information to the effect that service tickets can be used is presented on the display screen 1610 as guidance information together with bargain information. As a result, the user of the mobile device 10 identifies the fact that the service tickets can be used in the department store and confirms the content as required. Confirmation of the service content allows the user to select an item of the service tickets by means of the instruction portion 17. An example of the display screen of following item selection is shown in FIG. 10(b). Upon actually purchasing a good that is the subject of a service (for example, oolong tea, hearty vegetables, and so forth), the user receives a discount service by showing the display screen.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A communication terminal, comprising:
   starting means for starting an application program for displaying supply information once the supply information is transmitted by an external device;
   reception means for receiving report information that is emitted by the external device which is installed in a plurality of locations and usually emits report information by using short distance wireless communications, and which communicates an existence of the external device so as to inform said communication terminal that the communication terminal is within communication range of said external device, by using short distance wireless communications;
   display control means for causing display means to display a screen, in response to receiving said report information, for issuing an instruction with regard to whether the supply information is to be acquired upon reception of the report information by the reception means in a state where the application program has been started by the starting means; and
   instruction means for issuing an instruction to acquire the supply information via the screen that is displayed by the display control means,
   wherein the reception means receives the supply information by issuing a request to the external device to transmit the supply information when acquisition of the supply information has been instructed by the instruction means; and
   the display control means causes the display means to display the supply information received by the reception means.

2. The communication terminal according to claim 1, wherein the supply information is information with little temporal variation.

3. The communication terminal according to claim 1, wherein the supply information is link information indicating a connection destination other than the external device;
   the reception means request transmission of display information to the connection destination indicated by the link information and receive the display information; and
   the display control means cause the display means to display the display information received by the reception means.

4. The communication terminal according to claim 3, wherein the display information is domestic information of the connection destination; and
   the reception means request the transmission of the domestic information to the connection destination indicated by the link information via an international line and receive the domestic information.

5. An information supply system, comprising:
   starting means for starting an application program for displaying supply information once the supply information is transmitted by an external device;
   reception means for receiving report information that is emitted by the external device and which communicates an existence of the external device so as to inform said communication terminal that the communication terminal is within communication range of said external device;
   display control means for causing display means to display a screen in response to receiving said report information for issuing an instruction with regard to whether the supply information is to be acquired upon reception of the report information by the reception means in a state where the application program has been started by the starting means; and
   instruction means for issuing an instruction to acquire the supply information via the screen that is displayed by the display control means,
   wherein the reception means receives the supply information by issuing a request to the external device to transmit the supply information when acquisition of the supply information has been instructed by the instruction means;
   the display control means causes the display means to display the supply information received by the reception means; and
   an external device that is installed in a plurality of locations and usually emits report information by using short distance wireless communications,
   wherein the external device transmits the supply information in accordance with a request from the communication terminal.

6. An information supply method implemented by a communication terminal that is capable of communicating with an external device, comprising the steps of:
   starting an application program for displaying supply information that is eventually transmitted by the external device;
   receiving report information that is emitted by the external device which is installed in a plurality of locations and usually emits report information by using short distance wireless communications, and which communicates an existence of the external device so as to inform said communication terminal that the communication terminal is within communication range of said external device, by using short distance wireless communications;
   causing display means to display a screen for issuing an instruction with regard to whether the supply information is to be acquired upon reception of the report information in the report information reception step in a state where the application program has been started in the starting step;
   issuing an instruction to acquire the supply information via the screen that was displayed in the instruction screen display control step;
   receiving the supply information by issuing a request to the external device to transmit the supply information when acquisition of the supply information has been instructed in the instruction step; and
   causing the display means to display the supply information received in the supply information reception step.

7. The method of claim 6, wherein the supply information is information with little temporal variation.

8. The method of claim 6, wherein the supply information is link information indicating a connection destination other than the external device; and
   wherein said method further comprises requesting transmission of display information to the connection destination indicated by the link information and receiving the display information; and
   displaying the display information once received.

9. The method of claim 8, wherein the display information is domestic information of the connection destination; and the method further including the step of requesting transmission of the domestic information to the connection destination indicated by the link information via an international line and receiving the domestic information.

* * * * *